Patented Nov. 13, 1934

1,980,638

UNITED STATES PATENT OFFICE 1,980,638

METHOD FOR MAKING HYDROGENATION PRODUCTS OF KETONES OF THE PYRIDINE AND PIPERIDINE SERIES

Georg Scheuing and Ludwig Winterhalder, Nieder-Ingelheim-on-the-Rhine, Germany, assignors to firm of C. H. Boehringer Sohn, Nieder-Ingelheim-on-the-Rhine, Germany, a society of Germany No Drawing. Application June 1, 1929, Serial No. 367,827. In Germany June 1, 1928

35 Claims. (Cl. 260—25)

This invention relates to a method for making hydrogenation-products of ketones of the pyridine and piperidine series.

We have found that hydrogenation of compounds of the pyridine or piperidine series containing in α- or α- and α' position side chains with ketonic groups, especially hydrogenation of phenacyl compounds of the pyridine or piperidine series furnishes products which either themselves are therapeutically valuable or may be used as intermediate products for the manufacture of therapeutically valuable products.

The starting materials may have in α- or α- and α'-position one or more side chains such as compounds of the type —CH₂—CO—R, in which R is a carbocyclic radical, preferably a phenyl radical. On two side chains there may be two different carbocyclic radicals R and R₁ in the starting material. The N-atom of the starting materials used for the hydrogenation may be combined with an hydrogen atom or any desired radical such as an alkyl or aralkl group. Furthermore the starting materials may have a substituent of any kind such as hydrocarbon radicals, amino groups, halogen or the like in the pyridine or piperidine nucleus, in one of the carbocyclic groups R and R₁ present and respectively or in the substituent combined with the N-atom. The hydrogenation of the starting materials as well in the pyridine nucleus as in one or both of the keto groups may be carried out continuously, intermittently or simultaneously. Also polycyclic compounds derived from ketones of the pyridine or piperidine series such as wholly or partially hydrogenated or not hydrogenated ketones of the quinoline series, having for example the group —CH₂—CO—R in α-position to the N-atom, which may be combined with a hydrogen and may be used as starting material for the hydrogenation according to the invention.

The hydrogenation of the starting materials is carried out with gaseous hydrogen in presence of hydrogenation catalysts such as metals of the platinum group for example platinum, palladium and the like or their compounds or oxides such as platinum oxide. Also other metals or metal compounds such as nickel and the like may be used as catalysts alone or in mixture with the above mentioned catalysts. The catalysts may have any desired form and also be precipitated on carriers. For example platinum black, if necessary on one of the usual carriers, may be used. The hydrogenation may be carried out at atmospheric or higher pressure.

The nature of the starting materials, which may be employed as free bases for example in alcoholic solution, especially methyl alcohol, or as salts such as a solution of the bases or their chlorhydrates in glacial acetic acid, may be used for regulating the hydrogenation. The degree of the hydrogenation and the nature of the products obtained is also influenced by the working conditions such as the kind of solvent for the starting materials used, temperature and duration, pressure used, the pH-value of the solution, catlysts used and the like during the hydrogenation. Also by combination of several of these working conditions special effects may be obtained.

Thus for example α-phenacylpyridine of the formula

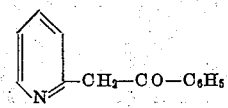

may be converted into the corresponding pyridyl reduction product of the formula

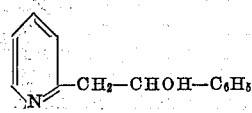

by shaking a solution of the free α-phenacylpyridine in methyl alcohol and in presence of platinum oxide with hydrogen, the reaction terminating, when 1 mol hydrogen has been taken up.

If the same substance dissolved in glacial acetic acid is hydrogenated under the same working conditions, it is possible to combine the starting material with 4 mols of hydrogen, thereby obtaining a pyridyl reduction compound of the formula

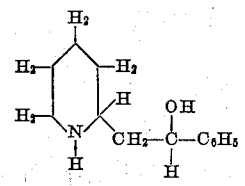

If two side chains with keto groups are present in the starting material, the reaction may for example be conducted in such a manner, that the CO-group in one side chain is converted into a secondary alcohol group, whereas the CO-group in the other side chain remains unchanged.

This result may also be obtained by starting the hydrogenation at room temperature or in the cold, thus bringing the reaction to a standstill, when 3 mols of hydrogen are taken up, and completing the hydrogenation by heating thus reacting also the other CO-group, which remained unchanged during the first step.

The hydrogenation may be carried out continuously or in stages. It is possible to isolate the products obtained in one or all of the different stages, which products may be purified and then subjected to a further hydrogenation treatment. This is however not necessary, as the reaction may also be completed without isolation of the intermediate products but with changes in the working conditions, in which case it is possible to obtain higher yields than without changes in the working conditions.

Also the sequence of the hydrogenation stages may vary in accordance with the nature of the starting materials. Thus for example, when hydrogenating pyridine compounds phenacylated in α- and α'-position with the N-atom not carrying a substituent, hydrogenation of the carbonyl groups takes place before the hydrogenation of the pyridine nucleus, whereas with quaternary pyridine salts hydrogenation of the nucleus takes place before hydrogenation of one or both of the carboxylic groups. Thus for example hydrogenation of α- and α'-phenacylated derivatives of piperidine leads to compounds of the piperidine series, which contain in one or both side chains an hydroxy group for the oxygen of the carbonyl group.

Hydrogenation of quaternary pyridinium compounds leads according to the invention in a very easy manner to N-alkylated or N-aralkylated derivatives of the piperidine series, thus avoiding the difficult N-alkylation of piperidine derivatives with the usual alkylating means.

The following formulas may serve to illustrate the great importance and the wide range of the invention, showing how it is possible to make hydrogenation products from ketones directly or indirectly over isolated or nonisolated intermediate products (alcohols), which latter may also be obtained in a different manner.

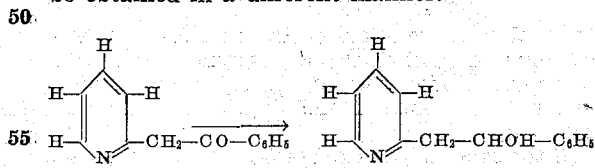

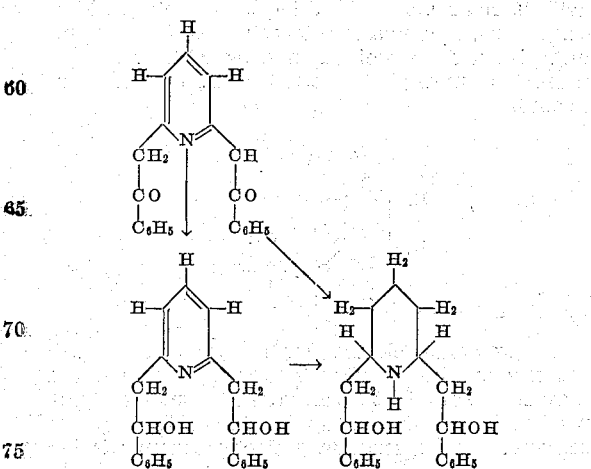

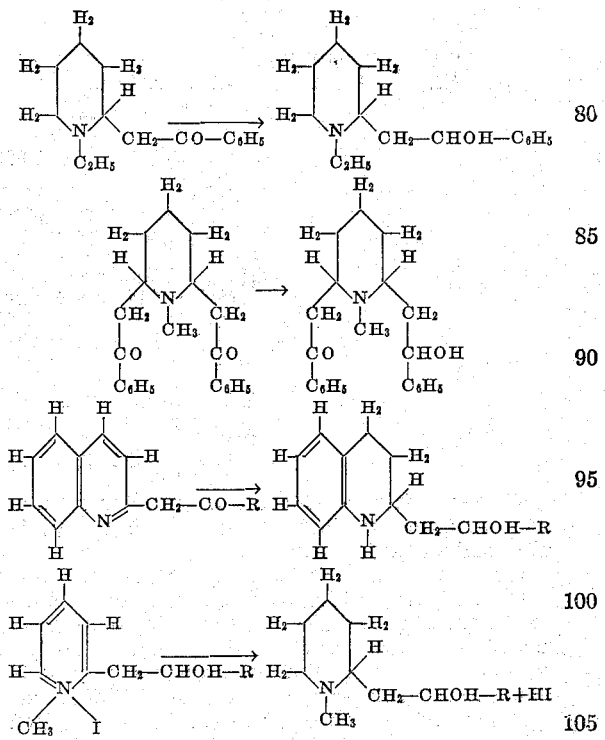

The possibility of obtaining different hydrogenation products from the same starting material may be illustrated by the following examples:

| Starting material | Working conditions | Products |
|---|---|---|
| α-phenacylpyridine | Base dissolved in methyl alcohol with platinum oxide | α - phenylhydroxy-ethylpyridine (1 mol hydrogen taken up) |
| Do | Hydrochloride dissolved in alcohol with palladium on barium sulfate. | Do. |
| Do | Hydrochloride dissolved in alcohol with platinum oxide | α - phenlyhydroxy-ethylpiperidine (4 mols hydrogen taken up). |
| Do | Hydrochloride in glacial acetic acid with platinum oxide, until 4 mols hydrogen are taken up. | Do. |
| α,α' - diphenacyl-pyridine. | Base in methyl alcohol with platinum oxide or hydrochloride in alcohol with palladium on barium sulfate. | α,α' - diphenylhy-droxyethylpyri-dine. |
| Do | Hydrochloride in alcohol with platinum oxide or in glacial acetic acid with platinum oxide, until 5 mols hydrogen are taken up. | α,α' - diphenylhy-droxyethylpiper-idine (nor-lobel-anidine) |

Examples (1) 10 g. of α-phenacylpyridine are dissolved in 100 ccm. of glacial acetic acid and shaken with hydrogen in presence of platinum oxide. When 4 mols hydrogen are taken up nearly quantitative yields of phenylhydroxyethylpiperidine may be isolated from the glacial acetic acid solution.

The reaction is as follows:

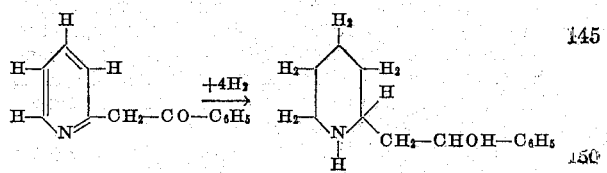

(2) 31.5 g. of α,α'-diphenacylpyridine are dissolved in 500 ccm. of methyl alcohol, to which 25 ccm. of concentrated hydrochloric acid are added. The solution is shaken with hydrogen and palladium precipitated upon barium sulfate. When working at about 40° C. 2 mols of hydrogen are taken up after six hours, the adsorption of hydrogen then coming to a standstill. After removal of the catalyst and evaporation of the solvent 31 g. of a chlorhydrate melting at 222° C. are obtained. This chlorhydrate is the hydrochloride of a dialcohol corresponding to the starting material.

The reaction is as follows:

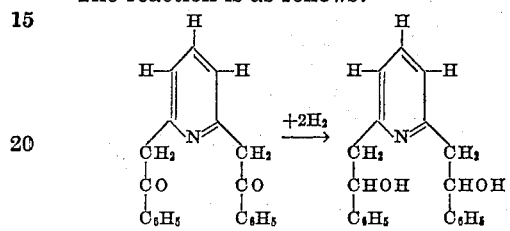

(3) 17.8 g. of α,α'-diphenylhydroxyethylpyridine chlorhydrate obtained according to example 2 are dissolved in 300 ccm. of methyl alcohol and shaken with 0.6 g. of platinum oxide and hydrogen at 40–50° C. 3.7 l of hydrogen are spent in about 8–9 hours and the velocity of hydrogenation then falls to about one fifteenth of the original velocity. When working up the reaction mixture two different chlorhydrates are obtained, of which one is very difficultly soluble in alcohol, being chlorhydrate of the Nor-Lobelanidine melting at 244° C., whereas the soluble chlorhydrate, melting at 200° C., is the hydrochloride of an isomeric compound of the Nor-Lobelanidine. Both bases, which are obtained in equal parts with a yield of about 95%, furnish Nor-Lobelanine on oxidation.

The reaction is as follows:

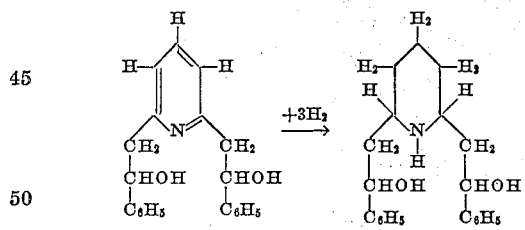

(4) 30 g. of the chlorhydrate of Nor-Lobelanine (α,α'-diphenacylpiperidine) dissolved in 300 ccm. of ethyl alcohol are shaken with 0.5 g. of platinum oxide in an atmosphere of hydrogen. When 1 mol of hydrogen is taken up, the velocity of hydrogenation drops to about one quarter of the original velocity. The catalyst is filtered off and the solution is crystallized, thereby obtaining about 8 g. of Nor-Lobelanidinechlorhydrate. To the mother liquor there is added ether; after standing awhile a mixture of unchanged Nor-Lobelanine, Nor-Lobelidinechlorhydrate and Nor-Lobelanidine crystallizes out from the mother liquor, which then nearly only contains dissolved the soluble Nor-Lobelidinechlorhydrate, which is precipitated by addition of ether or petrol ether to this new mother liquor. The precipitate, which is smeary, may be purified by crystallization from alcohol ether mixtures, thus obtaining about 10 g. of cristalline Nor-Lobelidinechlorhydrate melting at 201°. The intermediate fraction may furnish 2 g. of the same substance. The Nor-Lobelanidine, obtained as by-product may be oxidized to Nor-Lobelanine, which may be again used for hydrogenation.

The following reactions occur:

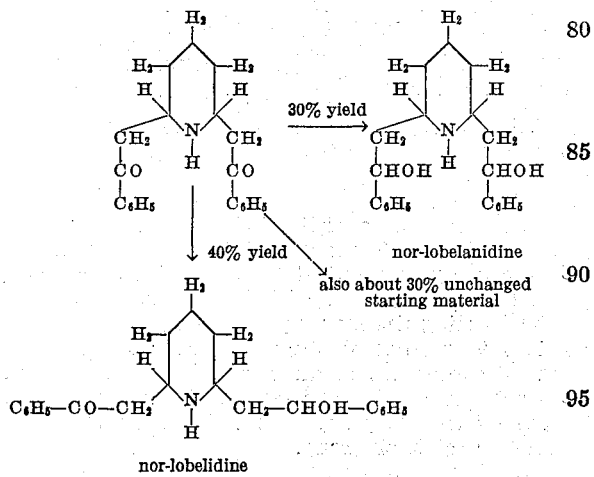

(5) 315 g. (1 mol) of dry α,α'-diphenacylpyridine are heated with 900 g. of the methyl ester of p-toluene sulfonic acid for about one hour to temperatures of about 150–160° C. The quaternary salt of the base used already starts to crystallize in the warmth. The reaction mixture is cooled, thoroughly, stirred with dry benzene or ether and then separated by suction. 450 g. of α,α'-diphenacylpyridinetoluenesulfomethylate are obtained on the filter. The salt crystallizes from methyl alcohol in long needles melting at 228° C. It furnishes the free base by treating its aqueous solution with ammonia.

191 g. of α,α'-diphenacylpyridinetoluenesulfomethylate dissolved or suspended in 2000 ccm. of methyl alcohol are shaken with 2 g. of platinum oxide in an atmosphere of hydrogen. 47 liters hydrogen are taken up in about 3 hours when the reaction comes to a standstill. The following reaction takes place:

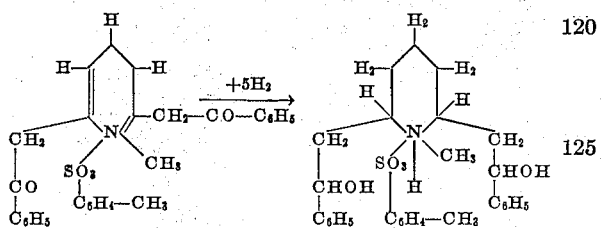

The catalyst is removed by filtration and the solvent is distilled off. The residue is mixed with diluted ammonia and treated with ether. On standing for a short time the ether solution furnishes 55 g. of Lobelanidine melting at 150° C. The hydrochloride melts at 136° C. The ethereal mother liquor furnishes further 5 g. of Lobelanidine, the whole yield being 47%. The ether residue is an isomeric Lobelanidine, which may be converted in the same manner as the obtained Lobelanidine into Lobelanine by oxidation.

Lobelanidine has the formula:

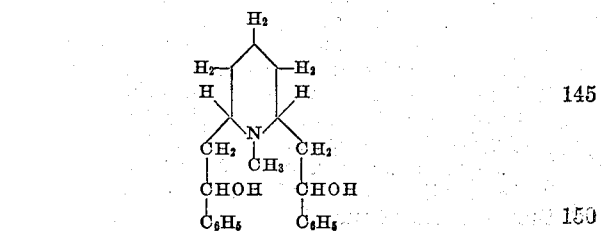

According to the invention it is possible to obtain new hydrogenation products from α-pyridyl and α-piperdylketones, which new products are of great interest for their near relation to the natural Lobelia alkaloids. The invention thus is a valuable step for synthetically making Lobelia alkaloids and similar bodies; thus for example Lobelidine (d-l-Lobeline), Lobelanidine or Nor-Lobelanidine may be prepared from an easily obtainable diketone of the pyridine series.

We claim:

1. A method consisting in hydrogenating a compound having five carbon and one nitrogen atoms, in cyclic union and at least one side chain containing a keto group in one of the α-positions, by treating the starting material with hydrogen in the presence of a hydrogenation catalyst and in the presence of an organic solvent, until at least one mol of hydrogen is taken up and at least one keto group is transformed into a secondary alcohol group.

2. A method consisting in hydrogenating a compound from the group consisting of pyridine and its homologues having at least one side chain containing a keto group in one of the α-positions, by treating the starting material with hydrogen in the presence of a hydrogenation catalylst, until at least one mol of hydrogen is taken up and at least one keto group is transformed into a secondary alcohol group.

3. A method consisting in hydrogenating a compound selected from the group consisting of pyridine and its homologues having at least one phenacyl group, in one of the α-positions, by treating the starting material with hydrogen in the presence of a hydrogenation catalyst, until at least one mol of hydrogen is taken up and at least one keto group is transformed into a secondary alcohol group.

4. A method consisting in hydrogenating a piperidine compound with at least one phenacyl group, in one of the α-positions, by treating the starting material with hydrogen in the presence of a hydrogenation catalyst and in the presence of an organic solvent, until at least one mol of hydrogen is taken up and at least one keto group is transformed into a secondary alcohol group.

5. A method according to claim 1 in which after transformation of one keto group into a secondary alcohol group the further hydrogenation is carried out in stages.

6. A method consisting in treating a quaternary salt of a pyridine compound having at least one phenacyl group in one of the α-positions, with hydrogen, in the presence of a hydrogenation catalyst.

7. A method according to claim 1 in which the hydrogenation is carried out with hydrogen, in the presence of a hydrogenation catalyst of the platinum group.

8. A method according to claim 1 in which the hydrogenation is carried out with hydrogen, in the presence of an oxide of a metal of the platinum group.

9. A method according to claim 1 in which the hydrogenation is carried out with hydrogen, in the presence of a metal of the platinum group.

10. A method according to claim 1 in which the hydrogenation is carried out with hydrogen, in the presence of a metal of the platinum group precipitated on a carrier.

11. A method according to claim 1 in which the hydrogenation is carried out with hydrogen, in the presence of nickel.

12. A method for making an α-phenylhydroxyethylpyridine, which consists in treating α-phenacylpyridine with hydrogen, in the presence of a hydrogenation catalyst.

13. A method for making an α-phenylhydroxyethyl piperidine, which consists in treating α-phenacylpyridine with hydrogen, in the presence of a hydrogenation catalyst, until four mols of hydrogen are taken up.

14. A method consisting in treating α,α'-diphenacylpyridine with hydrogen, in the presence of a hydrogenation catalyst, until one mol of hydrogen is taken up and α-phenylhydroxyethyl-α'-phenacylpyridine is formed.

15. A method consisting in treating α,α'-diphenacyl-pyridine with hydrogen, in the presence of a hydrogenation catalyst, until two mols of hydrogen are taken up and α,α'-diphenylhydroxyethylpyridine is formed.

16. A method consisting in treating α,α'-diphenacylpyridine with hydrogen, in the presence of a hydrogenation catalyst, until five mols of hydrogen are taken up and α,α'-diphenylhydroxyethylpiperidine (Nor-Lobelanidine) is formed.

17. A method consisting in treating α,α'-diphenacylpiperidine with hydrogen, in the presence of a hydrogenation catalyst and in the presence of an organic solvent, until one mol of hydrogen is taken up and α-phenylhydroxyethyl-α'-phenacylpiperidine (Nor-Lobelin) is formed.

18. A method consisting in treating α,α'-diphenacylpiperidine with hydrogen, in the presence of a hydrogenation catalyst and in the presence of an organic solvent, until two mols of hydrogen are taken up and α,α'-diphenylhydroxyethylpiperidine (Nor-Lobelanidine) is formed.

19. A method consisting in treating N-methylated α,α'-diphenacylpiperidine in the presence of a hydrogenation catalyst and in the presence of an organic solvent with hydrogen, until two mols of hydrogen are taken up and the two keto groups of the side chains are transformed into secondary alcohol groups whereby N-methylated α,α'-diphenylhydroxyethylpiperidine is formed.

20. A method consisting in treating N-methylated α,α'-diphenacylpiperidine, which is substituted in the methyl group by a hydrocarbon radical, in the presence of a hydrogenation catalyst, and in the presence of an organic solvent, with hydrogen, until two mols of hydrogen are taken up and the corresponding N-substituted α,α'-diphenylhydroxyethylpiperidine is formed.

21. A method consisting in treating a quaternary salt of α,α'-diphenacylpyridine containing an N-methyl group in the presence of a hydrogenation catalyst with hydrogen, until four mols of hydrogen are taken up and N-methylated α-phenylhydroxyethyl-α'-phenacylpiperidine is formed.

22. A method consisting in treating a quaternary salt of α,α'-diphenacylpyridine containing an N-methyl group substituted by a hydrocarbon radical with hydrogen in the presence of a hydrogenation catalyst, until four mols of hydrogen are taken up and an N-methylated-α-phenylhydroxyethyl-α'-phenacylpiperidine is formed which is substituted in the methyl group by a hydrocarbon radical.

23. A method consisting in treating a quaternary salt of α,α'-diphenacylpyridine containing an N methyl group in the presence of a hydrogenation catalyst with hydrogen, until five mols of hydrogen are taken up and N-methylated α,α'-diphenylhydroxyethylpiperidine is formed.

24. A method consisting in treating a quaternary salt of α,α'-diphenacylpyridine containing an N-methyl group substituted by a hydrocarbon radical in the presence of a hydrogenation catalyst with hydrogen, until five mols of hydrogen are taken up and N-methylated α,α'-diphenylhydroxyethylpiperidine is formed which is substituted in the methyl group by a hydrocarbon radical.

25. A method consisting in hydrogenating a piperidine compound with at least one phenacyl group in one of the α-positions, by treating the starting material with hydrogen in the presence of a hydrogenation catalyst selected from the group consisting of a metal of the platinum group precipitated on a carrier, and nickel, until at least one mol of hydrogen is taken up and at least one keto group is transformed into a secondary alcohol group.

26. A method consisting in treating α,α'-diphenacylpiperidine with hydrogen, in the presence of a hydrogenation catalyst selected from the group consisting of a metal of the platinum group precipitated on a carrier, and nickel, until one mol of hydrogen is taken up and α-phenylhydroxyethyl-α'-phenacylpiperidine (Nor-Lobeline) is formed.

27. A method consisting in treating α,α'-diphenacylpiperidine with hydrogen, in the presence of a hydrogenation catalyst selected from the group consisting of a metal of the platinum group precipitated on a carrier, and nickel, until two mols of hydrogen are taken up and α,α'-diphenylhydroxyethylpiperidine (Nor - Lobelanidine) is formed.

28. A method consisting in treating N-methylated α,α'-diphenacylpiperidine in the presence of a hydrogenation catalyst selected from the group consisting of a metal of the platinum group precipitated on a carrier, and nickel, with hydrogen, until two mols of hydrogen are taken up and the two keto groups of the side chains are transformed into secondary alcohol groups whereby N-methylated α,α'-diphenylhydroxyethylpiperidine is formed.

29. A method consisting in treating N-methylated α,α'-diphenacylpiperidine, which is substituted in the methyl group by a hydrocarbon radical, in the presence of a hydrogenation catalyst selected from the group consisting of a metal of the platinum group precipitated on a carrier, and nickel, with hydrogen, until two mols of hydrogen are taken up and the corresponding N-substituted α,α'-diphenylhydroxyethylpiperidine is formed.

30. A method consisting in hydrogenating a compound having five carbon and one nitrogen atoms, incyclic union and at least one side chain containing a keto group in one of the α-positions, by treating the starting material with hydrogen in the presence of a hydrogenation catalyst selected from the group consisting of a metal of the platinum group precipitated on a carrier, and nickel, until at least one mol of hydrogen is taken up and at least one keto group is transformed into a secondary alcohol group.

31. A method consisting in hydrogenating a compound having five carbon and one nitrogen atoms, in cyclic union and at least one side chain containing a keto group in one of the α-positions, by treating the starting material with hydrogen in the presence of a hydrogenation catalyst selected from the group consisting of a metal of the platinum group precipitated on a carrier, and nickel, and in the presence of an organic solvent until at least one mol of hydrogen is taken up and at least one keto group is transformed into a secondary alcohol group.

32. A method consisting in hydrogenating a compound having five carbon and one nitrogen atoms, in cyclic union and at least one side chain containing a keto group in one of the α-positions, by treating the starting material with hydrogen in the presence of a hydrogenation catalyst comprising an oxide of a metal of the platinum group, until at least one mol of hydrogen is taken up and at least one keto group is transformed into a secondary alcohol group.

33. A method consisting in hydrogenating a compound having five carbon and one nitrogen atoms, in cyclic union and at least one side chain containing a keto group in one of the α-positions, by treating the starting material with hydrogen in the presence of a hydrogenation catalyst comprising a metal of the platinum group precipitated on a carrier, until at least one keto group is transformed into a secondary alcohol group.

34. A method consisting in hydrogenating a compound having five carbon and one nitrogen atoms, in cyclic union and at least one side chain containing a keto group in one of the α-positions, by treating the starting material with hydrogen in the presence of a hydrogenation catalyst comprising nickel until at least one mol of hydrogen is taken up and at least one keto group is transformed into a secondary alcohol group.

35. A method consisting in hydrogenating a compound selected from the group consisting of pyridine and its homologues having at least one side chain containing a keto group in one of the α-positions, by treating the starting material with hydrogen in the presence of a hydrogenation catalyst and in the presence of an organic solvent, until at least one mol of hydrogen is taken up and at least one keto group is transformed into a secondary alcohol group.

GEORG SCHEUING.
LUDWIG WINTERHALDER.